United States Patent Office 3,462,395
Patented Aug. 19, 1969

3,462,395
METHOD FOR PREPARING ESTERS USING IMIDAZOLES AS CATALYSTS
Maria V. Wiener, Akron, Ohio, assignor to The Goodyear Tire & Rubber Company, Akron, Ohio, a corporation of Ohio
No Drawing. Filed Nov. 9, 1961, Ser. No. 151,182
Int. Cl. C08g 17/015
U.S. Cl. 260—75    6 Claims This invention relates to the preparation of glycol esters of polycarboxylic acids. More particularly, this invention relates to the method of preparing superpolyesters by the alcoholysis of esters of dicarboxylic acids with a glycol and the subsequent polymerization of these glycol esters to highly polymeric linear polyesters.

In the preparation of superpolyesters, one of the most satisfactory methods from the standpoint of simplicity of reaction and economy of operation has been the ester interchange method in which esters of dicarboxylic acids are reacted with a glycol to form the diglycol ester of the acid or a low molecular weight polymeric polyester which is then polymerized to a high molecular weight polymeric polyester by a condensation reaction with splitting out of glycol. This process, however, has not been entirely satisfactory because the initial ester interchange reaction is slow and because many of the materials that catalyze this reaction are not effective as catalysts for the subsequent condensation reaction.

Heretofore, various materials have been proposed as catalysts for the ester interchange reaction between esters of dicarboxylic acids and glycols and for the subsequent polymerization or condensation reaction. Metals in the form of powder, chips, ribbon or wire have been suggested, as well as catalysts having a large surface area such as powdered glass or silica gel. The more successful of the catalysts used in the past, however, have been materials such as the alkali metal and alkaline earth metal alcoholates, the alkali metal carbonates, alkaline earth oxides, and litharge.

Many of these materials are effective catalysts for the initial simple ester interchange and some of them catalyze the condensation reaction. However, many of the substances that catalyze the condensation reaction carry the polymerization only to a low degree or they do not promote the reaction effectively enough to give reaction rates acceptable for a commercial process.

According to the present invention, imidazole compounds catalyze the ester interchange between glycols and esters of polycarboxylic acids, greatly accelerate the polymerization of glycol esters or low polymers thereof and permit the formation, in relatively short reaction times, of polyesters of high molecular weight which may be readily processed to form products having excellent properties.

The following examples illustrate the invention.

EXAMPLE 1

A glass reaction vessel in the shape of a tube approximately 35 centimeters long having an inside diameter of 38 millimeters, having a side arm and equipped with a nitrogen gas inlet tube and a stirrer was charged with 58.2 grams of dimethyl terephthalate, 41.1 grams of ethylene glycol and 0.25 gram of imidazole. The mixture was stirred and heated by means of a vapor bath having a temperature of 217° C. while a slow stream of oxygen-free nitrogen gas was passed over the reaction mixture. The alcoholysis reaction was essentially complete after two hours when approximately the theoretical amount of methanol recoverable had distilled out of the mixture. Then a vapor bath having a temperature of 245° C. was used to heat the mixture and the pressure in the system was slowly reduced over a period of 45 minutes to 1 millimeter of mercury pressure while the excess glycol distilled out of the mixture. Then the temperature was raised to 280° C. by heating with a vapor bath boiling at this temperature. After 2 hours heating at 280° C. and 1 millimeter of mercury pressure a low polymer was formed.

EXAMPLE 2

Fifty-eight and two-tenths grams of dimethyl terephthalate, 41.1 grams of ethylene glycol, 0.25 gram of imidazole were placed in a reaction vessel of the type used in Example 1. The mixture was heated by means of a vapor bath having a temperature of 217° C. and stirred while a slow stream of oxygen-free nitrogen gas was passed over the reaction mixture. The alcoholysis reaction was essentially complete after two hours when approximately the theoretical amount of methanol recoverable had distilled out of the mixture. When the alcoholysis was complete a vapor bath having a temperature of 245° C. was used to heat the mixture and the pressure in the system was slowly reduced over a period of 45 minutes to 1 millimeter of mercury pressure while the excess glycol distilled out of the mixture. Then 0.017 gram antimony trioxide was added and the temperature was raised to 280° C. by heating with a vapor bath boiling at this temperature. After 1¾ hours heating at 280° C. and 1 millimeter of mercury pressure the polymer formed had an intrinsic viscosity of 0.50.

EXAMPLE 3

Fifty-eight and two-tenths grams of dimethyl terephthalate, 41.1 grams of ethylene glycol, and 0.015 gram of zinc diimidazole were reacted according to the procedure of Example 1. The polymeric polyester obtained had an intrinsic viscosity of 0.583.

Various other imidazole compounds were tested for catalytic activity according to the procedure of Example 1. The results are set out in Table 1.

TABLE 1

| Example No. | Catalyst | Percent based on dimethyl phthalate ester | Condensation time (hrs.) | Intrinsic viscosity |
|---|---|---|---|---|
| 4 | Lead diimidazole | 0.055 | 2 | 0.755 |
| 5 | Zinc diimidazole | 0.033 | 1⅚ | 0.781 |
|   | Sb₂O₃ | 0.030 | | |
| 6 | Cadmium diimidazole [1]. | 0.039 | 2 | 0.755 |
|   | Sb₂O₃ | 0.030 | | |
| 7 | Imidazole | 0.034 | 2 | 0.792 |
|   | Zinc diacetate | 0.030 | | |
|   | Sb₂O₃ | 0.030 | | |
| 8 [2] | Zinc diacetate | 0.030 | 2¼ | 0.750 |
|   | Sb₂O₃ | 0.030 | | |

[1] In Example No. 6 a mixture of 52.4 grams of dimethyl terephthalate and 5.8 grams of dimethyl isophthalate was used to prepare a 90/10 ethylene terephthalate-ethylene isophthalate copolyester instead of the polyethylene terephthalate homopolymer prepared in the other examples.
[2] Example 8 was a control with no imidazole present.

The practice of the invention has been illustrated with particular respect to the preparation of polymeric ethylene terephthalate and an ethylene terephthalate-ethylene isophthalate copolyester. Polymeric ethylene isophthalate and copolyesters containing various ratios of ethylene terephthalate to ethylene isophthalate can similarly be made using the catalysts of the invention from isophthalate esters and mixtures of terephthalate and isophthalate esters.

In the production of highly polymeric polyesters from bis esters and a glycol such as the dimethyl phthalate esters and ethylene glycol, the imidazoles can act as catalyst for the initial ester interchange. They are also effective as catalysts in the condensation polymerization reaction. Thus the imidazoles can be added to a mixture of bis esters of the acids and a glycol and the ester interchange and condensation reactions then carried out to prepare the polymeric polyester. If desired, the bis glycol esters can be prepared by ester interchange or other suitable method and the imidazole compound added to the bisglycol esters and the condensation polymerization then carried out to prepare the polymer. Also, if desired, the imidazole can be added to a low molecular weight polymer of the bis glycol ester or to a mixture of low molecular weight polymer and bis glycol ester of the acids and the polymerization reaction carried out to prepare the polymeric polyester. Imidazoles are slightly volatile and slowly distill at elevated temperature under low pressures so they are most effective in the initial ester interchange reaction. Larger amounts must be used to catalyze the polymerization reaction to produce polyesters having an intrinsic viscosity above 0.5. Generally it is desirable to keep the catalyst concentration low because high catalyst concentrations contribute to polymer instability and impart color to the product. It is preferred, therefore, that imidazoles be used in conjunction with another material which bonds or complexes the imidazoles in some way and minimizes their loss by distillation and which also acts as an ester interchange and condensation catalyst. Thus the imidazoles can be used with compounds such as zinc, lead, calcium, manganese, cadmium, titanium, and antimony compounds, particularly the oxides and salts of these metals with organic acids. Also, imidazole salts of heavy metals as well as salts such as cerium, neodymium, lanthanum, calcium, and magnesium imidazole salts can be used. Preferred catalysts are the zinc, lead, calcium, manganese, and cadmium salts of imidazole. These salts increase the rate of the ester interchange reaction and promote the formation of high molecular weight polyesters.

The catalysts of the invention are imidazole compounds, representative examples of which are imidazole, alkyl substituted imidazoles such as 4-methyl imidazole, aryl substituted imidazoles such as 4-phenyl imidazole, halogen substituted imidazoles such as 4-chloro imidazole, 4-bromo imidazole, arylene imidazoles such as benzimidazole, and salts of imidazoles. Representative examples of salts are salts of imidazoles with metals such as cadmium, lead, and zinc; salts of imidazoles with alkaline earth metals such as calcium and magnesium; and salts of imidazoles with other metals such as manganese, cerium, lanthanum, and neodymium. Representative examples of metal salts are zinc diimidazole, lead diimidazole, calcium diimidazole, magnesium diimidazole, manganese diimidazole, cadmium diimidazole, cerium triimidazole, lanthanum triimidazole, neodymium triimidazole, zinc dibenzimidazole, lead dibenzimidazole, calcium dibenzimidazole, manganese dibenzidimidazole, cadmium dibenzimidazole, magnesium dibenzimidazole, cerium tribenzimidazole, lanthanum tribenzimidazole, and neodymium tribenzimidazole. They can be used alone as the sole catalyst or they can be used in mixtures with each other or with other catalysts.

The amount of the catalyst used may be varied over wide concentrations. As is usual in catalysts, the amount will be relatively small. As a general rule the amount will be within the range of from 0.3 to 1.0% based on the ester of polycarboxylic acid used. When a free imidazole is used as the sole catalyst the amount used will be within the range of 0.03 to 1.0% based on the amount of phthalate ester used. When the imidazole is used in combination with a metal which bonds or complexes the imidazole or forms a salt of the imidazole, the amount used calculated as the imidazole salt will be in the range of from 0.0003 to 0.10%, generally from 0.005 to 0.08% based on the phthalate ester used to give a satisfactory reaction rate and a product of suitable viscosity and color.

In the practice of the invention the preparation of the glycol esters and the polymerization reaction are, in general, carried out in accordance with the usual known techniques. Thus, the reactions are preferably carried out in the absence of oxygen, generally in an atmosphere of an inert gas such as nitrogen or the like in order to lessen darkening and to make it possible to obtain a high molecular weight pale or colorless product. The polymerization or condensation reaction is carried out under reduced pressure, generally below 10 millimeters of mercury pressure and usually at or below 1 millimeter of mercury pressure at a temperature in the range of from 260 to 290° C.

The examples given illustrate the invention, particularly with respect to the dimethyl esters of terephthalic and isophthalic acid and ethylene glycol. The catalysts of the invention are effective with other esters such as the ethyl, propyl, butyl, and phenyl esters of the phthalic acids and other aromatic and aliphatic acids. Thus the invention is applicable also to the manufacture of linear polyesters derived from other acids and/or other glycols. Representative examples of other acids are aliphatic acids of the general formula

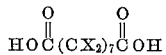

where X is hydrogen or a low alkyl group and $n$ is zero to ten such as oxalic acid, malonic acid, succinic acid, glutaric acid, adipic acid, sebacic acid, suberic acid, etc.; methyl succinic acid, α-methyl adipic acid; aromatic acids such as the phthalic acids, the naphthalene dicarboxylic acids, the diphenyl dicarboxylic acids; and araliphthatic acids such as α,β-diphenyl ethane-4,4'-dicarboxylic acid, α,δ-diphenyl butane 4,4'-dicarboxylic acid. Representative examples of other glycols that can be used are the propylene glycols, the butylene glycols, pentamethylene glycol, decamethylene glycol, alkyl substituted polymethylene glycols such as 2,2-dimethyl 1,3-propane diol, 2,2-diethyl 1,3-propane diol, diethylene glycol, 2,2-bis[4-(beta-hydroxyethoxy)phenyl] propane and cyclohexane dimethanol. The phthalic acids and ethylene glycol are preferred because of their low cost and ready availability. Thus, in a preferred embodiment, ethylene glycol is reacted with a bis ester of at least one acid selected from the group consisting of terephthalic acid and isophthalic acid and the resulting glycol ester or low polymer thereof condensed to form a high molecular weight linear polyester in the presence of the catalyst of the invention.

While certain representative embodiments and details have been shown for the purpose of illustrating the invention, it will be apparent to those skilled in this art that various changes and modifications may be made therein without departing from the spirit or scope of the invention.

I claim:

1. In a process for preparing a polyester by subjecting an ester selected from the group consisting of methyl, ethyl, propyl, butyl and phenyl esters of a polycarboxylic acid to alcoholysis in the presence of an excess of a glycol and thereafter subjecting the glycol ester thus formed to condensation with the removal of glycol, the improvement which comprises carrying out both the alcoholysis and condensation in the presence of a catalytic amount of imidazole.

2. In a process for preparing a polyester which comprises subjecting a bis glycol ester of at least one acid selected from the group consisting of terephthalic acid and isophthalic acid to condensation with the removal of glycol the improvement which comprises carrying out said condensation in the presence of a catalytic amount of zinc diimidazole.

3. In a process for preparing a polyester which comprises subjecting a bis glycol ester of at least one acid selected from the group consisting of terephthalic acid and isophthalic acid to condensation with the removal of glycol the improvement which comprises carrying out said condensation in the presence of a catalytic amount of lead diimidazole.

4. A process for the manufacture of linear, fiber-forming polyesters by reesterification of an ester of a dicarboxylic acid selected from the group consisting of adipic acid, sebacic acid, terephthalic acid, a naphthalene dicarboxylic acid and a diphenyldicarboxylic acid and methanol with a bifunctional organic hydroxy compound having 2 to 8 carbon atoms and subsequent polycondensation of the dihydroxy ester obtained under reduced pressure at a temperature within the range of from 260° to 290° C., which comprises catalyzing the reesterification and the polycondensation by adding 0.005 to 0.08 percent by weight, calculated on the dicarboxylic acid ester, of an acid imide selected from the group consisting of imidazole and benzimidazole of a metal selected from the group consisting of calcium, magnesium, zinc, cadmium, lanthanum, lead and manganese.

5. A process for the manufacture of linear, fiber-forming polyesters by reesterification of an ester of a dicarboxylic acid selected from the group consisting of adipic acid, sebacic acid, terephthalic acid, a naphthalene dicarboxylic acid and a diphenyldicarboxylic acid and methanol with a bifunctional organic hydroxy compound having 2 to 8 carbon atoms and subsequent polycondensation of the dihydroxy ester obtained under reduced pressure at a temperature within the range of from 260° to 290° C., which comprises catalyzing the reesterification by the addition of 0.0003 to 0.10 percent by weight, calculated on the dicarboxylic acid ester, of an acid imide selected from the group consisting of imidazole and benzimidazole of a metal selected from the group consisting of calcium, magnesium, zinc, cadmium, lanthanum, lead and manganese.

6. A process for the manufacture of linear, fiber-forming polyesters by reesterification of an ester of a dicarboxylic acid selected from the group consisting of adipic acid, sebacic acid, terephthalic acid, a naphthalene dicarboxylic acid, and a diphenyldicarboxylic acid and methanol with a bifunctional organic hydroxy compound having 2 to 8 carbon atoms and subsequent polycondensation of the dihydroxy ester obtained under reduced pressure at a temperature within the range of from 260° to 290° C., which comprises catalyzing the polycondensation by the addition of 0.005 to 0.08 percent by weight, calculated on the dicarboxylic acid ester, of an acid imide selected from the group consisting of imidazole and benzimidazole of a metal selected from the group consisting of calcium, magnesium, zinc, cadmium, lanthanum, lead and manganese.

References Cited

UNITED STATES PATENTS 2,956,974 10/1960 De Witt et al. _____ 260—75
3,049,509 8/1962 Hardy et al. _____ 260—45.8

WILLIAM H. SHORT, Primary Examiner

LOUISE P. QUAST, Assistant Examiner

U.S. Cl. X.R.

260—47, 475, 485